US009713742B2

United States Patent
Pasini et al.

(10) Patent No.: US 9,713,742 B2
(45) Date of Patent: Jul. 25, 2017

(54) CONTROL INTERFACE OF AN EXERCISING MACHINE SUITABLE TO ASSUME OPERATING MODES

(71) Applicant: Technogym S.p.A., Gambettola, Forlì-Cesena (IT)

(72) Inventors: Alessandro Pasini, Cesena (IT); Ivan Faedi, Savignano sul Rubicone (IT)

(73) Assignee: Technogym S.p.A., Gambettola (IT)

( * ) Notice: Subject to any disclaimer, the term of this patent is extended or adjusted under 35 U.S.C. 154(b) by 124 days.

(21) Appl. No.: 14/694,049

(22) Filed: Apr. 23, 2015

(65) Prior Publication Data

US 2015/0306456 A1     Oct. 29, 2015

(30) Foreign Application Priority Data

Apr. 28, 2014  (IT) .............................. MI2014A0780

(51) Int. Cl.
| | |
|---|---|
| *A63B 24/00* | (2006.01) |
| *G09B 19/00* | (2006.01) |
| *A63B 71/06* | (2006.01) |
| *A63B 22/02* | (2006.01) |
| *A63B 22/06* | (2006.01) |

(52) U.S. Cl.
CPC .......... *A63B 24/00* (2013.01); *A63B 24/0062* (2013.01); *A63B 24/0087* (2013.01); *A63B 71/0622* (2013.01); *G09B 19/0038* (2013.01); *A63B 22/02* (2013.01); *A63B 22/0605* (2013.01); *A63B 2022/0652* (2013.01); *A63B 2071/065* (2013.01); *A63B 2071/0625* (2013.01); *A63B 2071/0658* (2013.01); *A63B 2207/02* (2013.01); *A63B 2210/50* (2013.01); *A63B 2220/17* (2013.01); *A63B 2220/18* (2013.01); *A63B 2220/20* (2013.01); *A63B 2220/30* (2013.01); *A63B 2220/805* (2013.01); *A63B 2225/50* (2013.01)

(58) Field of Classification Search
CPC . A63B 24/00; A63B 24/0062; A63B 24/0087; A63B 2071/0625; A63B 2071/065; A63B 2071/0658; A63B 2220/17; A63B 2220/18; A63B 2220/20; A63B 2220/30; A63B 2220/805; A63B 22/02; A63B 22/0605; A63B 2225/50; A63B 71/0622
See application file for complete search history.

(56) References Cited

U.S. PATENT DOCUMENTS

| | | | |
|---|---|---|---|
| 2002/0077221 A1* | 6/2002 | Dalebout ............. | A63B 26/003 482/57 |
| 2004/0162189 A1* | 8/2004 | Hickman ........... | A63B 24/0062 482/8 |
| 2009/0258758 A1* | 10/2009 | Hickman ........... | A63B 24/0084 482/8 |

(Continued)

*Primary Examiner* — Glenn Richman
(74) *Attorney, Agent, or Firm* — Blank Rome LLP (57) ABSTRACT

An exercise machine suitable to assume various operating modes. The exercise machine includes a control interface which comprises a control device configured to receive at least one command by a user to be provided to the exercise machine for performing a physical exercise. The control device is further configured to provide the user with a piece of information representative of the operating mode of the exercise machine.

20 Claims, 1 Drawing Sheet

(56) References Cited

U.S. PATENT DOCUMENTS

| | | | | |
|---|---|---|---|---|
| 2010/0056340 A1* | 3/2010 | Ellis | ............... | A61B 5/1038 |
| | | | | 482/4 |
| 2014/0206503 A1* | 7/2014 | Stockmaster | .......... | A61H 3/008 |
| | | | | 482/4 |

* cited by examiner

FIG. 1

CONTROL INTERFACE OF AN EXERCISING MACHINE SUITABLE TO ASSUME OPERATING MODES

FIELD OF THE INVENTION

The present invention relates to the field of fitness and particularly to a control interface for an exercise machine and to an exercise machine provided with this control interface.

BACKGROUND OF THE INVENTION

Nowadays, exercise machines are typically provided with a control panel or interface thereof in order to allow the user interacting with the machine and performing the training thereon as best as possible, possibly with the help of qualified staff (personal trainer).

This control panel comprises, possibly in addition to a displaying screen (for example, of touch screen technology), a set of push-buttons which allow a user (or qualified staff) to interact with the exercise machine in order to set the parameters of the training to be performed, check data related to the training being carried out or just ended, set possible multimedia applications which the exercise machine is provided with, for example applications to enjoy multimedia contents (for example, audio and/or video files) during the use of the exercise machine for training, and so on.

The technological evolution of the exercise machines, the increasing functions, as well as users' needs, have required a remarkable increase of the control panel complexity an exercise machine is provided with.

This control panel can be very difficult and sophisticated to use, or anyway not easily understandable, both by a user more or less skilled in the fitness subject, and by a user more or less familiar with the more advanced technology (for example in case of elders).

Also the possible assistance—either pre-, during or post-training—by a qualified personal trainer to instruct a user on how to use an exercise machine having this difficult and sophisticated control panel does not appear to be the best choice, also considering that the constant presence of a personal trainer supporting a user involves a significant cost both for the gym and the user, even more if the exercise machine is at a user's home.

Therefore, the need is strongly felt to have control panels or interfaces of an exercise machine which are more and more able to enable the use of the exercise machine by a user in an a way as simple, fast and intuitive as possible, possibly without the presence of qualified staff being necessary, or generally without help.

SUMMARY OF THE INVENTION

The object of the present invention is to provide a control interface for an exercise machine that allows overcoming the above-mentioned drawbacks with reference to the prior art, particularly being as easy and intuitive as possible to use.

This object is achieved by an exercise machine comprising a control interface, according to claim 1.

A control interface for an exercise machine and a method for controlling an exercise machine are also objects of the present invention.

BRIEF DESCRIPTION OF THE DRAWINGS

Further characteristics and advantages of the interface of an exercise machine according to the invention will appear from the description below of preferred exemplary embodiments, given by way of indicative, though non-limitative examples, with reference to the attached FIG. 1, schematically illustrating part of an exercise machine provided with a control interface for an exercise machine, according to an embodiment of the invention.

DETAILED DESCRIPTION OF THE PREFERRED EMBODIMENTS

Figure 1:
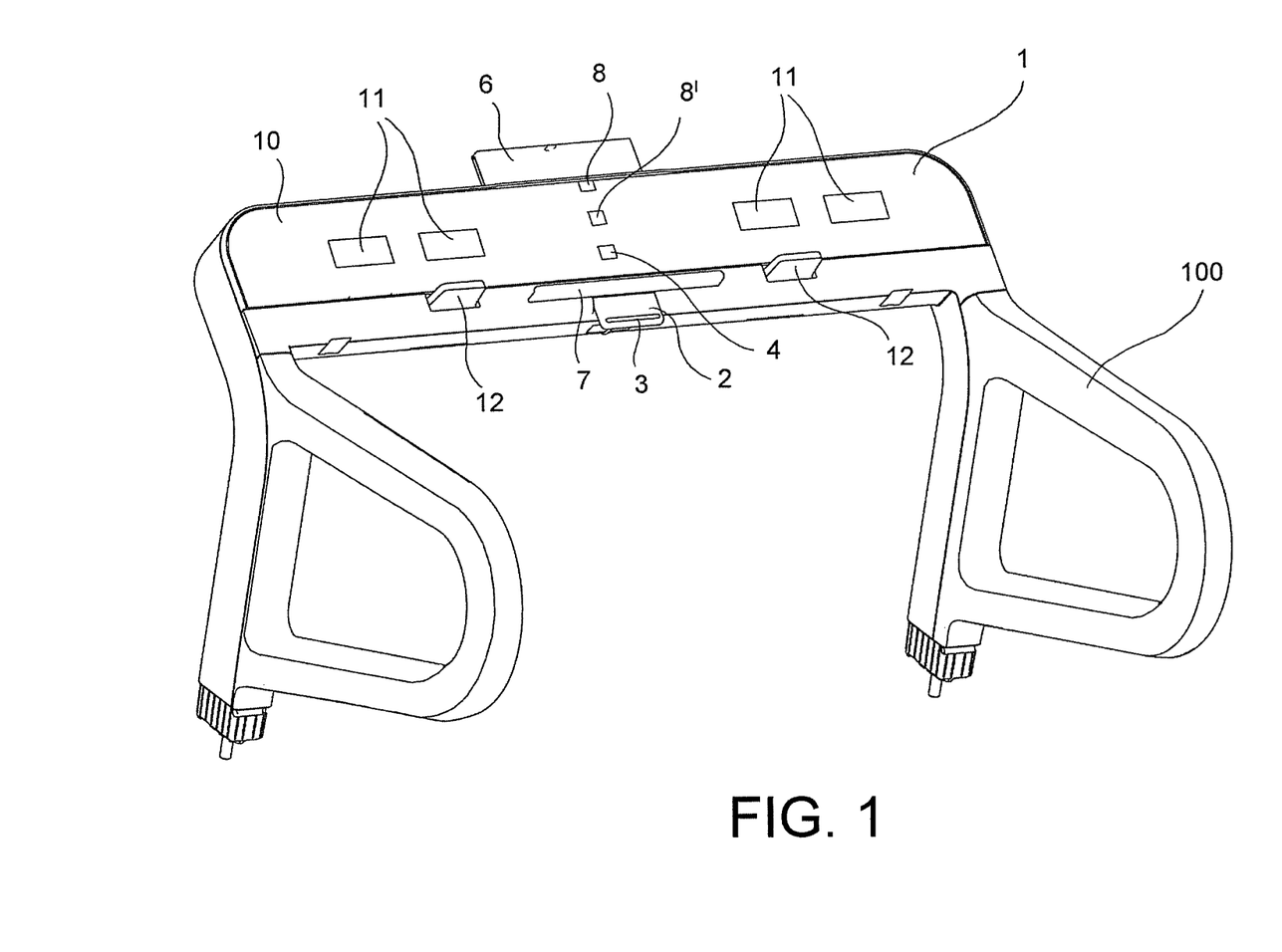

With reference to the above-mentioned FIGURE, an exercise machine will be now described, shown as a whole with numeral 100, provided with an exercise machine control interface, according to the present invention.

For the purposes of the present invention, with exercise machine is meant any machine usable by a user to perform a physical exercise or physical activity (both training and rehabilitation) such as for example, in the cardio-cardiovascular field, a treadmill (tapis roulant), an exercise bike with reclining seat, a traditional exercise bike, or, in the strength field, any muscular development apparatus, and so on.

In FIG. 1, the exercise machine 100, only partially shown, is a treadmill. This choice must not be interpreted as limiting the scope of the invention, which, on the contrary, could be applied advantageously to any type of exercise machines, as defined above.

The exercise machine 100 is suitable to assume operating modes, during the normal use thereof.

For the purposes of the present description, with operating mode of an exercise machine is meant any state and/or operating condition the exercise machine can assume upon use, among which, by way of non-limiting examples:

"turning on", "start", "ready for the user's physical exercise" (START);

"physical exercise being carried out by the user" or "in exercise" (EXERCISE);

"turning off", "end", "stop" (STOP);

"low energy consumption" (STAND BY);

"temporary stop" or "pause" (PAUSE).

With further reference to the exercise machine 100 of FIG. 1, it should be understood that it comprises, according to one embodiment, a control interface or panel 1 of the exercise machine 100.

The control interface 1, in the following also simply interface 1, according to one embodiment, is configured to make the exercise machine 100 assume an operating mode wherein the exercise machine 100 is ready for the user's physical exercise (START).

Moreover, according to a further embodiment (either as an alternative or in addition to the one discussed above), the control interface 1 is configured to make the exercise machine 100 assume an operating mode of a physical exercise being performed by the user (EXERCISE).

Moreover, according to a further embodiment (either as an alternative or in addition to the ones discussed above), the control interface 1 is configured to make the exercise machine 100 assume an operating mode of low energy consumption (STAND BY).

In addition, according to a further embodiment (either as an alternative or in addition to the previous ones), the control interface 1 is configured to make the exercise machine 100 assume an operating mode of stop (STOP).

With reference to the embodiment of FIG. 1, the control interface 1 comprises a control device 2 which is configured to receive at least one command by a user to be provided to the exercise machine 100 for performing a physical exercise.

For the purposes of the present description, with said at least one command to be provided to the exercise machine 100 is meant any command that can be supplied to the exercise machine 100 by the user to perform the user's physical exercise or physical activity either on or with the exercise machine 100 such as, by way of example, the turning on or starting command (START), the turning off, ending or stop command (STOP), the pause command (in case this operating mode is provided), and so on.

In more details, according to one embodiment, the control device 2, in case the exercise machine 100 is in the operating mode where it is ready for the physical exercise, is configured to allow the user to start his/her physical exercise.

Moreover, according to a further embodiment (as an alternative or in addition to the previous one), the control device 2, in case the exercise machine 100 is in the operating mode of a physical exercise being performed by the user, is configured to allow the user to stop the exercise machine 100.

According to the embodiment of FIG. 1, the control device 2 preferably comprises only one push-button. Therefore, by the actuation of this push-button it is possible for the user to make the exercise machine 100 assume an operating mode, for example the operating mode of a physical exercise being performed by the user (EXERCISE) and the operating mode of stop (STOP).

According to one embodiment, the push-button can be of the electrical type.

According to a further embodiment, the push-button can be of a tactile type, for example in touchscreen technology.

Back to interface 1 of the embodiment of FIG. 1, it must be pointed out that the control device 2 is moreover advantageously configured to provide the user with a piece of information representative of an operating mode of the exercise machine 100.

Particularly, as will be detailed below, from the piece of information representative of an operating mode of the exercise machine 100 provided by the control device 2, both the operating mode of the exercise machine 100 and the operating mode that the exercise machine 100 can assume following further actuation of the control device 2 can be known.

Thereby, this advantageously allows the user to have a single control device (preferably a single push-button, according to one embodiment) with which he/she is able to easily know both the operating mode of the exercise machine 100 and the operating mode the exercise machine 100 can assume in case of a further actuation of the control device 2.

Therefore, the user can interact with the exercise machine 100 in an easier and more secure way at the same time, for example avoiding having to locate every time which one is the key or the push-button to be pressed on the control interface in order to provide a specific command to the exercise machine 100.

In more details, according to one embodiment, the control device 2 comprises a signalling module 3 configured to provide the user with the piece of information representative of an operating mode of the exercise machine 100.

Particularly, according to one embodiment, the signalling module 3 comprises a light indicator configured to provide a set colour chosen from a plurality of colours.

In more details, each colour or colours combination of said plurality of colours is representative of the piece of information representative of an operating mode of the exercise machine 100.

Particularly, the light indicator can have a first colour (for example, green) to provide the piece of information representative of the operating mode where the exercise machine is ready for the user's physical exercise (READY TO GO).

Therefore, this piece of information shows the user that at the subsequent actuation of the control device 2 (or subsequent pressure, in case the control device 2 is a push-button) the exercise machine 100 can be caused to assume the operating mode of a physical exercise being performed by the user. Implicitly, this piece of information also advantageously shows the user that the exercise machine 100, by being in the operating mode where it is ready for the user's physical exercise and not already in the operating mode of a physical exercise being performed by the user, is safe (for example, in case the exercise machine 100 is a treadmill, the belt is not moving and there is no danger for an approaching user).

In addition, the light indicator can have a second colour (for example, red) to provide the piece of information representative of the operating mode of the physical exercise being carried out by the user (EXERCISE).

This piece of information shows the user that, upon a subsequent actuation of the control device 2 (or following a pressing action, in case the control device 2 is a push-button), it will be possible to make the exercise machine 100 assume the operating mode of stop. Implicitly, this piece of information advantageously also shows to the user that the exercise machine 100, by being in the operating mode of a physical exercise being performed by the user and not already in the operating mode of stop, is not safe (for example, in case the exercise machine 100 is a treadmill, the belt is moving and there is danger for another approaching user).

Again, in a further embodiment, to be considered together with the ones described previously, the light indicator can flash the first colour (for example, green) to provide the piece of information representative of the operating mode of temporary stop of the exercise machine (PAUSE). This can be obtained by actuating the control device (in the push-button case, by pushing the same) for a time interval greater than a set reference time value, for example 2 seconds.

This piece of information (first colour—green —flashing) shows the user that at the subsequent actuation of the control device 2 (or following a pressing action, in case the control device 2 is a push-button) it will be possible to make the exercise machine 100 assume the operating mode of a physical exercise being performed by the user. Implicitly, this piece of information also advantageously shows to the user that the exercise machine 100, by being in the operating mode of temporary stop of the exercise machine and not already in the operating mode of a physical exercise being performed by the user, is safe (for example, in case the exercise machine 100 is a treadmill, the belt is not moving and there is no danger for any other user who may approach the exercise machine 100).

In addition, the light indicator can be off to provide implicitly the piece of information representative of the operating mode of stop of the exercise machine (OFF) or else the piece of information representative of the operating mode of low energy consumption.

Back to the signalling module 3 of the control device 2, it should be understood that, according to a further embodiment, alternative to the one described above, it comprises a luminous display configured to provide a set alphanumeric string chosen from a plurality of alphanumeric strings.

It should be noted that each alphanumeric string of said plurality of alphanumeric strings is representative of the piece of information representative of an operating mode of the exercise machine 100.

According to a further embodiment, the signalling module 3 comprises a luminous display configured to provide a set alphanumeric string having a set colour, respectively chosen from a plurality of alphanumeric strings and a plurality of colours.

It should be noted that each alphanumeric string of said plurality of alphanumeric strings having a colour of said plurality of colours is representative of the piece of information representative of an operating mode of the exercise machine 100.

Therefore, both embodiments described above provide the same advantages described above with particular reference to the embodiment where the signalling module 3 is a light indicator. These advantages will be not repeated here.

Now, referring back to the embodiment of FIG. 1, the interface 1 comprises at least one first presence detecting sensor 4, for example an optical sensor with infrared technology.

The at least one first presence detecting sensor 4 is configured to generate a piece of information representative of the user presence on the exercise machine 100.

For this reason, it must be pointed out that the control device 2 is advantageously configured to provide the piece of information representative of the operating mode of the exercise machine 100 where it is ready for the user's physical exercise based on the piece of information representative of the user presence on the exercise machine 100 generated by said at least one first presence detecting sensor 4.

In greater detail, it should be understood that said at least one first presence detecting sensor 4 is configured to detect presence within a set operating range, for example between 10 cm and 1m. In other words, said at least one first presence detecting sensor 4 is configured to work "remotely". Again, with reference to FIG. 1, the interface 1 further comprises at least one support base 6 of a user portable electronic device (not shown in FIG. 1) associable to said control interface 1.

For the purposes of the present invention, with user portable electronic device is meant any portable electronic device, for example, a cellular phone (smartphone) or a tablet portable computer (tablet), on which is preferably possible that the user loads and executes a dedicated program code (application) suitable to allow the user using the exercise machine which the portable electronic device is associable with.

The above-mentioned program code is suitable to allow user's authentication (LOGIN) on the exercise machine 100, in order to be able to enter his/her personal dedicated area, retrieving the stored data related to his/her past trainings and set training program to be performed on the exercise machine 100.

Moreover, the program code is suitable to allow the user defining a set training program on the exercise machine 100 or loading a set training program on the exercise machine 100 which was previously prepared by qualified staff (personal trainer) and/or previously loaded on the portable electronic device as available in and downloaded from a remote database to which the portable electronic device can be connected through a data communication channel, either in wireless o wired mode, to transfer data.

Back to FIG. 1, it should be noted that, in one embodiment, said at least one support base 6 is of a removable type. In more details, said at least one support base 6 is slidingly arranged inside a seat (not visible in the FIGURE) defined in the upper part of the control interface 1. When extracted from the respective seat, the support base 6 represents a support surface of a portable electronic device associable to the exercise machine 100.

It should be noted that, according to one embodiment, as an alternative or in addition to the one just described, the interface 1 can comprise an elastic coupling part (not shown in the FIGURE) suitable to stabilize the portable electronic device when the latter is placed on the support base 6.

For example, this elastic coupling part is removable from the control interface 1 and can be arranged on the upper side of the portable electronic device, when the latter is placed on the support base 6.

Again, with reference to FIG. 1, the interface 1 moreover comprises at least one second presence detecting sensor 8, for example an optical sensor with infrared technology. The at least one second presence detecting sensor is configured to generate a piece of information representative of the presence of a user portable electronic device associated with said at least one support base 6.

It should be pointed out that said at least one second presence detecting sensor 8 is configured to detect the presence within a further set operating range, for example between 0 cm and 2 cm. In other words, said at least one second presence detecting sensor 8 is configured to work "closely".

In the embodiment of FIG. 1, the interface 1 further comprises a further support base 7, for example a support bar in the form of a bookrest, of the user portable electronic device associable to said control interface 1.

According to a further embodiment, as an alternative or in addition to the one just described, the interface 1 can comprise a further elastic coupling part (also not shown in the FIG. 1) suitable to stabilize the portable electronic device when the latter is placed on the further support base 7. This further elastic coupling part can be altogether similar to the elastic coupling part described above, in other words it can be removed from the control interface 1 and arranged on the upper side of the portable electronic device, when the latter is placed on the further support base 7.

Moreover, with further reference to FIG. 1, the interface 1 also comprises a further presence detecting sensor 8', for example an optical sensor with infrared technology. The further second presence detecting sensor 8' is configured to generate a piece of information representative of the presence of a user portable electronic device associated with said further support base 7.

It should be noted that, in further embodiments, the interface 1 can comprise only one of said at least one support base 6 and one further support base 7 and only one of said at least one second presence detecting sensor 8 and said further presence detecting sensor 8'. Moreover, according to further embodiments, the control interface 1 may not be provided with the elastic coupling part or the further elastic coupling part or both.

Back to the embodiment of FIG. 1, the interface 1 further comprises a displaying screen 10 configured to provide the user with parameters representative of the user's physical exercise on the exercise machine 100.

It should be pointed out that with user's physical exercise is meant both the physical exercise (physical activity or training) performed (i.e., carried out and completed) by the user on the exercise machine 100, and the physical exercise (physical activity or training) being performed (i.e., which is being carried out) on the exercise machine.

For the purposes of the present description, with parameters representative of the user's physical exercise on the exercise machine is meant parameters representative of the execution of the physical exercise by the user on the exercise machine 100, such as, for example: in case the exercise machine 100 is a treadmill, running velocity, treadmill slope, covered distance, running time, and so on; in case the exercise machine 100 is an exercise bike (traditional or with reclining seat), pedalling velocity, covered distance, pedalling time; in case the exercise machine 100 is a muscular development apparatus, repetitions number, physical exercise execution time, and so on.

Back to the embodiment of FIG. 1, the displaying screen 10 preferably comprises a plurality of portions 11 that can be lightened by said control interface 1.

In more details, each portion of said plurality of portions 11 can be lightened by said control interface 1 to display a parameter representative of the user's physical exercise on the exercise machine 100.

As mentioned above, the exercise machine 100, a portion of which being illustrated in FIG. 1 is, for example, a treadmill. In this case, as shown in FIG. 1, the plurality of portions 11 of the displaying screen 10 comprise at least four portions that can be lightened (symbolically represented by a rectangle) each one suitable to display, upon instructions of the control interface 1, one of the parameter representative of the user's physical exercise (running or walk) on the exercise machine 100 (treadmill): running velocity, treadmill slope, covered distance, running time.

It should be pointed out that, according to one embodiment, alternative to the one described above, the control interface 1 may not be provided with the displaying screen 10.

Moreover, referring back to the embodiment of FIG. 1, the control interface 1 comprises further command devices 12, for example levers (joysticks), configured to receive commands by the user in order to change (increase/decrease) some parameters representative of the user's physical exercise on the exercise machine 100, for example to change the exercise machine 100 velocity or slope, in case it is a treadmill.

Referring back to the control interface 1 of FIG. 1 in general, in case the exercise machine 100 is in the operating mode of stop and said at least one first presence detecting sensor 4 does not detect any user presence over a determined time interval, for example equal to 10 minutes, the control interface 1 is configured to control the exercise machine 100 such as it advantageously assumes an operating mode of low energy consumption (STAND-BY).

In more details, when the exercise machine 100 is in the operating mode of low energy consumption, the interface 1 is configured to turn off the displaying screen 10 and the signalling module 3 of the control device 2.

Again, according to one embodiment, the control interface 1, when said at least one first presence detecting sensor 4 detects one user presence, is configured to control the exercise machine 100 such as it moves from the operating mode of low energy consumption to an operating mode where it is ready for the user's physical exercise.

In greater detail, in this case, when the exercise machine 100 moves to the operating mode where it is ready for the user's physical exercise, the control interface 1 is configured to turn on the displaying screen 10 and the signalling module 3 of the control device 2.

Particularly, the interface 1 is configured to turn the plurality of lightable portions 11 of the displaying screen on.

Moreover, the signalling module 3 of the control device is configured to provide the user with a piece of information representative of the operating mode of the exercise machine 100 where it is ready for the user's physical exercise.

According to one embodiment, where the signalling module 3 is a light indicator, it is configured to provide a first colour, for example green, representative of the piece of information representative of the operating mode of the exercise machine 100 where it is ready for the user's physical exercise.

It should be noted that the use of the first colour, for example green, allows the user intuitively identifying the possibility to start the physical exercise on the exercise machine 100 by the following actuation of the control device 2. Moreover, as stated above, this piece of information advantageously shows the user that the exercise machine 100 is safe because it is not yet actually working (for example, in case the exercise machine 100 is a treadmill, the treadmill is not yet moving).

According to a further embodiment, in case the signalling module 3 is a luminous display, it is configured to provide a first alphanumeric string representative of the piece of information representative of the operating mode of the exercise machine 100 where it is ready for the user's physical exercise.

According to a further embodiment, the signalling module 3 is configured to provide a first alphanumeric string having a first colour (for example, green) representative of the piece of information representative of the operating mode of the exercise machine 100 where it is ready for the user's physical exercise.

Both the embodiments just described, have the same advantages of the embodiment where the signalling module 3 is a light indicator.

Back to the embodiment of FIG. 1, when the user actuates the control device 2, based on the piece of information representative of the exercise machine 100 operating mode where it is ready for the user's physical exercise provided by the signalling module 3, the control interface 1 is configured to control the exercise machine 100 such as it assumes a operating mode of a physical exercise being performed by the user.

Particularly, when the exercise machine 100 assumes the operating mode of a physical exercise being performed by the user, the displaying screen 10 is configured to provide the user with parameters representative of the user's physical exercise on the exercise machine 100.

In more details, each parameter representative of the user's physical exercise on the exercise machine 100 can be displayed through a respective lightable portion of said plurality of lightable portions 11 of the displaying screen 10.

Moreover, when the exercise machine 100 assumes the operating mode of a physical exercise being performed by the user, the signalling module 3 of the control device 2 is configured to provide the user with the piece of information representative of the operating mode of a physical exercise being performed by the user.

According to one embodiment, where the signalling module 3 is a light indicator, it is configured to provide a second colour, for example red, representative of the piece of information representative of the operating mode of a physical exercise being performed by the user.

It should be noted that the use of the second colour, for example red, advantageously allows the user intuitively identifying the possibility to stop the physical exercise on the exercise machine 100 by the actuation of the control device 2. Moreover, as stated above, this piece of information advantageously shows the user that the exercise machine 100 is not safe because it is still actually running (for example, in case the exercise machine 100 is a treadmill, the treadmill is still moving).

According to a further embodiment, in case the signalling module 3 is a luminous display, it is configured to provide a second alphanumeric string representative of the piece of information representative of the operating mode of a physical exercise being performed by the user.

According to a further embodiment, the signalling module 3 is configured to provide a second alphanumeric string having a second colour (for example, red) representative of the piece of information representative of the exercise machine 100 operating mode of a physical exercise being performed by the user.

Both the embodiments described above, have the same advantages as the embodiment where the signalling module 3 is a light indicator.

Back to FIG. 1 in general, when the user actuates the control device 2 based on the piece of information representative of the operating mode of a physical exercise being performed by the user provided by the signalling module 3, the interface 1 is configured to control the exercise machine 100 such as it assumes an operating mode of stop.

In more details, it should be noted that, following the actuation of the control device 2 to allow the user to stop the exercise machine 100, the control interface 1 is configured to turn off both the signalling module 3 of the control device 2, and the displaying screen 10, after a determined time interval is elapsed (for example, equal to 10 minutes) where the exercise machine 100 is in the operating mode of stop. Thus, the control interface 1 is configured to allow the exercise machine 100 assuming the operating mode of low energy consumption.

According to one embodiment, it should be pointed out that when the user actuates the control device 2 based on the piece of information representative of the operating mode, of a physical exercise being performed by the user provided by the signalling module 3, for a time interval greater than the set reference time value (for example, equal to 2 seconds), the control interface 1 is configured to control the exercise machine 100 such that it assumes an operating mode of temporary stop (PAUSE). In case the control device 2 is a push-button, this actuation consists in pressing the push-button for a time interval greater than the set reference time value.

In case the exercise machine 100 assumes the operating mode of temporary stop, the displaying screen 10 is configured to provide the user with parameters representative of the user's physical exercise reached until the temporary stop of the exercise machine 100.

Moreover, the signalling module 3 is configured to provide the user with a piece of information representative of the operating mode of temporary stop of the exercise machine 100.

According to one embodiment, where the signalling module 3 is a light indicator, it is configured to flash the first colour, for example green, representative of the piece of information representative of the operating mode of temporary stop of the exercise machine 100.

It should be noted that the use of the first colour, for example green, allows the user intuitively identifying the possibility to restart the physical exercise on the exercise machine 100, by the subsequent actuation of the control device 2. Moreover, this piece of information advantageously shows the user that the exercise machine 100 is safe because still actually not running (for example, in case the exercise machine 100 is a treadmill, the treadmill is still not moving).

According to a further embodiment, in case the signalling module 3 is a luminous display, it is configured to provide a further alphanumeric string representative of the piece of information representative of the operating mode of temporary stop of the exercise machine 100.

According to a further embodiment, the signalling module 3 is configured to flash the further alphanumeric string having a first colour (for example, green) representative of the piece of information representative of the operating mode of the exercise machine 100 where it is ready for the user's physical exercise.

Both the embodiments just described, have the same advantages as the embodiment where the signalling module 3 is a light indicator.

Moreover, according to one embodiment, in case the exercise machine 100 is in the operating mode of temporary stop, when the user actuates the control device 2 based on the piece of information representative of the operating mode of temporary stop of the exercise machine 100 provided by the signalling module 3, the control interface 1 is configured to control the exercise machine 100 such as it assumes the operating mode of a physical exercise being performed by the user.

Also in this case, the signalling module 3 is configured to provide the user with a piece of information representative of the operating mode of a physical exercise being performed by the user according to the procedures and with the advantages already previously described, according to different embodiments of the signalling module 3 of the control device 2.

Now, back to the control interface 1 according to one embodiment of the present invention, it should be understood that it is advantageously configured to form a data communication channel through a wired connection (for example, through a docking station) or through a wireless connection (for example, a Bluetooth connection or a Wi-Fi network) with the user portable electronic device, for example a smartphone or a tablet, previously cited and not illustrated in FIG. 1.

In greater detail, the control interface 1 is advantageously configured to receive commands from the portable electronic device which are to be provided to the exercise machine 100 when said at least one second presence detecting sensor 8 (and/or also the further presence detecting sensor 8') detects the presence of the portable electronic device associated with the control interface 1, for example when put on said at least one support base (and/or also on said further support base 7).

This advantageously increases the security level of the exercise machine 100, which, otherwise, could receive commands from the control interface 1 every time a portable electronic device is nearby the exercise machine 100, and it is not associated thereto instead.

Moreover, it must be restated that the signalling module 3 of the control device 2 is configured to provide the piece of information representative of the operating mode of the exercise machine 100 where it is ready for the user's physical exercise, according to procedures and with advantages already previously described, according to different embodiments of the signalling module 3.

In this case, in one embodiment, the control interface 1 is advantageously configured to provide the exercise machine 100 with a command received by the user portable electronic device, associated with the control interface 1, only when the user actuates the control device 2 based on the piece of information representative of the operating mode of the exercise machine 100 where it is ready for the user's physical exercise, provided by the signalling module 3.

It should be noted that a further security level is thereby also introduced for the user before the exercise machine 100 is used for the physical exercise. Although the user portable electronic device has been properly put on the control interface 1 and the user has authenticated himself/herself and set the exercise machine 100 to carry on the physical exercise, the exercise machine 100 will be safe until it is activated by the actuation of the control device 2 by the user.

Finally, it should be pointed out that the control interface further comprises a data processing unit, for example a microprocessor or a microcontroller, and a memory unit, which is functionally connected to the data processing unit.

The memory unit and the data processing unit, both not illustrated in FIG. 1, are configured, respectively, to store program codes and data processed during the execution of these program codes and to load and execute these program codes to allow the control interface 1 performing the operations previously described.

It should be noted that all the electrical/electronic components described above, by being part of the control interface 1, are functionally associated with the data processing unit.

The definition "control interface configured to" implies that is the data processing unit of the control interface to be "configured to".

Moreover, it should be pointed out that the data processing unit of the control interface 1, in one embodiment, can be the data processing unit of the exercise machine 100 while, in another embodiment, it can be additional and functionally associated with a further data processing unit of the exercise machine 100.

As stated above, it is also an object of the present invention a method to control an exercise machine 100 suitable to assume operating modes, the latter already defined in the present description.

In greater detail, according to one embodiment, the method comprises a step of providing a control interface 1 comprising a control device 2 configured to receive at least one command by a user to be provided to the exercise machine 100 to carry out the physical exercise.

Moreover, this method comprises a step of providing a piece of information representative of an operating mode of the exercise machine 100, by the control device 2.

The control interface 1 is altogether similar to the one described above, with reference to various embodiments of the present invention.

Again, with reference to FIG. 1, an example of the operation of the control interface 1, in general of the exercise machine 100 provided with said control interface 1, in case this exercise machine 100 is a treadmill, will be now described.

If not already connected, the user connects the exercise machine 100 to the power grid and pushes an ON/OFF switch to turn on the exercise machine 100.

The displaying screen 10 (the plurality of lightable portions 11) turns on.

The signalling module 3 of the control device 2 provides a piece of information representative of the operating mode of the exercise machine 100 where it is ready for the user's physical exercise (READY TO RUN or START), for example providing the first colour (green).

The user actuates the control device 2, for example by pushing the push-button, the treadmill starts moving and the user starts the physical exercise (running or walk) on the treadmill (exercise machine 100).

In this case, the exercise machine 100 assumes the operating mode of a physical exercise being performed by the user (EXERCISE), the displaying screen 10 shows parameters representative of the physical exercise carried out by the user on the treadmill (running or walk velocity, running or walk slope, covered distance, running or walk time), the signalling module 3 of the control device 2 provides a second red colour representative of the piece of information representative of the operating mode of physical exercise being carried out by the user (EXERCISE) assumed by the exercise machine 100.

The user, by looking at the signalling module 3 of the control device 2 providing the second red colour, is aware that by actuating the control device 2 the exercise machine 2 will stop. Moreover, another user approaching the exercise machine 100, through the red colour provided by the signalling module 3, immediately understands that the exercise machine 100 is running and thus potentially dangerous to approach.

The user actuates the control device 2 for a time interval greater than a set reference time value (for example, by keeping the push-button pressed for at least 2 seconds): the exercise machine 100 moves in the operating mode of temporary stop; the displaying screen 10 shows parameters representative of the exercise carried out by the user up to the temporary stop of the exercise machine 100; the signalling module 3 of the control device 2 provides the first flashing green colour.

The user, by looking at the signalling module 3 of the control device 2 configured to provide the first flashing green colour, is aware that by actuating the control device 2 later the exercise machine 100 will move again in the operating mode of a physical exercise being performed by the user. Moreover, the flashing green colour implicitly signals the user that the exercise machine 100 is safe, as it is not yet moving.

The user, by actuating the control device 2, stops the exercise machine 100 and leaves the exercise machine 100.

The displaying screen 10 and the signalling module 3 of the control device 2 turn off, after a determined time interval (for example, 10 minutes) is elapsed where the exercise machine 100 is in the operating mode of stop, and the exercise machine 100 moves to an operating mode of low energy consumption.

In case he/she is provided with a portable electronic device (for example, a smartphone or a tablet), according to a further example of the control interface 1 operation, the user associates the portable electronic device to said at least one support base 6.

The user authenticates himself/herself on the exercise machine 100 (LOGIN), through the portable electronic device, if provided, and either transfers one set training program to it which is stored in the portable electronic device previously downloaded from a remote database or creates a training program directly in the exercise machine 100, through the portable electronic device.

The user actuates the control device 2, for example by pushing the push-button, and starts the physical exercise (running or walk) on the treadmill (exercise machine 100).

From this moment on, the operation of the control interface 1 and exercise machine 100 provided with this control interface 1, is altogether similar to the one described above in the case of a user not being provided with a portable electronic device. Therefore, this operation example will not be repeated.

When the user stops the exercise machine 100, in case he/she did LOGIN, the user terminates the training session (LOGOUT) on the exercise machine 100 and removes the portable electronic device from said at least one support base 6.

As it is possible to observe, the control interface and the exercise machine having this control interface present several advantages, some of which already shown above, which allow achieving the object of the invention.

First of all, the fact that the control interface is provided with a control device having a signalling module configured to provide a piece of information representative of the operating mode of the exercise machine in a way which is also intuitive (for example, by providing different colours, green or red), allows the user easily identifying both the operating mode of the exercise machine and the possibility to make the exercise machine assume a different operating mode, simply actuating the control device 2.

Moreover, the fact that the commands that can be given to the exercise machine, through the control interface, can only be given through the control device provided with signalling module enables a simple and prompt use of the exercise machine by the user, even when the user is not particularly technology skilled.

Again, the use of presence detecting sensors advantageously allows, on the one side, to make the exercise machine assume an operating mode of low energy consumption, in case no user approaches the exercise machine for a determined time interval, and, on the other side, to considerably increase the safety of the exercise machine.

In fact, the use of at least one presence detecting sensor configured to detect the presence of a user portable electronic device only when it is associated with (that is, placed on) the exercise machine avoids that another user, provided with a portable electronic device, may interact with the control interface of the exercise machine even when the portable electronic device is not associated with the exercise machine.

Moreover, the fact that the control interface allows using the exercise machine only after the actuation of the control device, introduces a further security level for the user, although at least one presence detecting sensor has detected the presence of a portable electronic device associated with (that is placed on) the exercise machine.

To the embodiments of the control interface and exercise machine provided with this control interface as described above, those skilled in the art may carry out modifications, adjustments and replacements of parts with others functionally equivalent, in order to meet contingent needs, without departing from the scope of the following claims. Each characteristic described as being part of one possible embodiment can be independently embodied by the other embodiments described herein.

The invention claimed is:

1. An exercise machine suitable to assuming operating modes, comprising a control interface, said control interface comprises:
  a control device configured to receive at least one command by a user to be provided to the exercise machine for performing a physical exercise,
    wherein said control device is further configured to provide the user with information representative of an operating mode of the exercise machine,
    said control interface being configured to make the exercise machine assume an operating mode in which it is ready for the physical exercise of the user,
  wherein the control interface comprises at least one first presence detecting sensor, said at least one first presence detecting sensor being configured to generate information representative of the user's presence at the exercise machine, said control device being configured to provide the information representative of the operating mode of the exercise machine in which it is ready for the physical exercise of the user based on the information representative of the user's presence at the exercise machine generated by said at least one first presence detecting sensor.

2. The exercise machine according to claim 1, wherein the control device, in the case that the exercise machine is in the operating mode in which it is ready for the physical exercise of the user, is configured to allow the user to begin the exercise.

3. The exercise machine according to claim 1, wherein the control interface is configured to make the exercise machine assume an operating mode of a physical exercise being performed by the user.

4. The exercise machine according to claim 3, wherein the control device, in the case that the exercise machine is in the operating mode of a physical exercise being performed by the user, is configured to allow the user to stop the exercise machine.

5. The exercise machine according to claim 1, wherein the control interface is configured to make the exercise machine assume an operating mode of low energy consumption.

6. The exercise machine according to claim 1, wherein the control interface is configured to make the exercise machine assume a stopped operating mode.

7. The exercise machine according to claim 1, wherein the control device comprises only one push button.

8. The exercise machine according to claim 1, wherein said control device comprises a signalling module configured to provide the information representative of the operating mode of the exercise machine to the user.

9. The exercise machine according to claim 8, wherein said signalling module comprises a light indicator configured to provide a determined color selected from within a plurality of colors, each color of said plurality of colors being representative of the information representative of the operating mode of the exercise machine.

10. The exercise machine according to claim 1, wherein the control interface further comprises:
  at least one support base of a portable electronic device of the user associable to said control interface;
  at least one second presence detecting sensor configured to generate information representative of the presence of a portable electronic device of the user associated with said support base.

11. The exercise machine according to claim 1, wherein said control interface further comprises a display screen configured to provide parameters representative of the user's physical exercise at the exercise machine to the user.

12. The exercise machine according to claim 1, wherein, in the case that the exercise machine is in a stopped operating mode and for a determined period of time said at least one first presence detecting sensor does not detect any presence of the user, the control interface is configured to control the exercise machine so that it assumes an operating mode of low energy consumption.

13. The exercise machine according to claim 12, wherein said control interface, when the exercise machine is in the operating mode of low energy consumption, is configured to switch the display screen and the signalling module of the control device off.

14. The exercise machine according to claim 1, wherein the control interface, when said at least one first presence detecting sensor detects the presence of a user, is configured to control the exercise machine so that it assumes an operating mode in which it is ready for the user's physical exercise.

15. The exercise machine according to claim 14, wherein said control interface, when the exercise machine passes to the operating mode in which it is ready for the user's physical exercise, is configured to switch the display screen and the signalling module of the control device on.

16. The exercise machine according to claim 15, wherein said signalling module of the control device is configured to provide the information representative of the operating mode of the exercise machine in which it is ready for the physical exercise of the user to the user.

17. The exercise machine according to claim 1, wherein said control interface is configured to form a wireless-type communication channel with a portable electronic device of the user, said control interface being configured to receive commands to be provided to the exercise machine from the portable electronic device when said at least one second presence detecting sensor detects the presence of the portable electronic device associated with the control interface.

18. The exercise machine according to claim 17, wherein said signalling module of the control device is configured to provide the information representative of the operating mode of the exercise machine in which it is ready for the user's physical exercise, said control interface being configured to provide a command to the exercise machine, which is received from the portable electronic device associated with the control interface when the user actuates the control device based on the information representative of the operating mode of the exercise machine in which it is ready for the physical exercise of the user provided by the signalling module.

19. A control interface for an exercise machine suitable to assume operating modes, comprising:
   a control device configured to receive at least one command by a user to be provided to the exercise machine for performing a physical exercise,
   wherein said control device is further configured to provide the user with information representative of an operating mode of the exercise machine,
   said control interface being configured to make the exercise machine assume an operating mode in which it is ready for the physical exercise of the user,
   wherein the control interface comprises at least one first presence detecting sensor, said at least one first presence detecting sensor being configured to generate information representative of the user's presence at the exercise machine, said control device being configured to provide the information representative of the operating mode of the exercise machine in which it is ready for the physical exercise of the user based on the information representative of the user's presence at the exercise machine generated by said at least one first presence detecting sensor.

20. A method for controlling an exercise machine suitable to assume operating modes, comprising:
   providing a control interface comprising a control device configured to receive at least one command by a user to be provided to the exercise machine for performing a physical exercise, said control interface being configured to make the exercise machine assume an operating mode in which it is ready for the physical exercise of the user;
   providing to the user, by said control device, information representative of an operating mode of the exercise machine,
   generating, by at least one first presence detecting sensor of the control interface, information representative of the user's presence at the exercise machine,
   providing, by said control device, the information representative of the operating mode of the exercise machine in which it is ready for the physical exercise of the user based on the information representative of the user's presence at the exercise machine generated by said at least one first presence detecting sensor.

* * * * *